Patented Oct. 8, 1940

2,216,793

UNITED STATES PATENT OFFICE 2,216,793

MANUFACTURE OF COLORED ARTIFICIAL MATERIALS

Percy Frederick Combe Sowter and Reuben Betteridge, Spondon, near Derby, England, assignors to Celanese Corporation of America, a corporation of Delaware No Drawing. Application January 22, 1938, Serial No. 186,320. In Great Britain February 4, 1937

9 Claims. (Cl. 18—54)

This invention relates to the manufacture of colored artificial filaments, threads, yarns, fibres, ribbons, films, foils and like materials, and particularly to the manufacture of such materials having a basis of regenerated cellulose.

Artificial filaments, threads, yarns, fibres, ribbons, films, foils and like materials having a basis of regenerated cellulose are in general produced by the extrusion of viscose or cuprammonium solutions of cellulose into aqueous coagulating baths. It has now been discovered that the coloration of such materials may very satisfactorily be effected simultaneously with the production of the materials by incorporating dyestuffs into the coagulating baths employed, or by incorporating dyestuff components into the coagulating baths and thereafter converting the dyestuff components to dyestuffs on the materials. In this way the coloration of the materials is effected actually during their formation and very deep shades of satisfactory fastness may be obtained.

Any suitable dyestuff may be employed in solution in the coagulating baths. Of particular value are dyestuffs which have an affinity for regenerated cellulose materials and which are readily soluble in water. The well-known dyestuffs marketed under the trade name "Icyl" are examples of such dyestuffs. As indicated above, instead of introducing the finished dyestuffs into the coagulating baths, compounds which may readily be converted into the final dyestuff may be introduced into the coagulating baths. Thus, for example, a diazotisable compound may be introduced into the coagulating bath and the extruded materials subsequently subjected to the operations of diazotisation and coupling. Again, a compound capable of coupling with a diazotised compound may be introduced into the coagulating bath and the extruded materials subsequently treated with a diazotised compound. Or, again, there may be introduced into the coagulating bath a diazotisable compound and a coupling component and the extruded materials may subsequently be subjected to a process of diazotisation.

This last method of forming azo dyestuffs on the materials is of particular value. It is preferable to select azo components and coupling components which may readily be coupled together. Extruded filaments and like materials issuing from the coagulating bath may conveniently be collected by leading them through the usual funnel into a centrifugal spinning box, in accordance with the usual practice in collecting such wet-spun materials, and it is convenient when forming azo dyestuffs on the materials by processes wherein the diazotisable component and the coupling component are applied in the coagulating bath in accordance with this invention, to apply the diazotising agent to the materials as they pass through the spinning funnel.

Another method of coloring artificial filaments and other materials according to this invention is to incorporate in the coagulating bath a leuco compound of a vat dyestuff or a sulphuric or other ester of such leuco compound and to develop the vat dyestuff on the extruded materials. Thus there may be employed the solubilised vat dyestuffs sold under the trade names "Indigosol" and "Soledon". The development of the color may be effected by the application of the developing agent on the washing gutter, the spinning funnel or in the centrifugal spinning box. In using solubilised vat dyestuffs of the Indigosol and Soledon series it is preferable to make up the solution of these dyestuffs in the coagulating bath in a dull light as the compounds tend to oxidise in bright light.

The proportion of dyestuff or dyestuff component incorporated in the coagulating baths will depend on the depth of shade required and on the solubility of the dyestuff or dyestuff component in the particular coagulating bath. In general proportions of 0.1 to 0.5 or 1% on the coagulating bath give satisfactory shades.

In accordance with this invention viscose solutions may be extruded into aqueous coagulating baths containing, for example, acids, e. g. sulphuric acid and aryl sulphonic acids and/or salts, e. g. sodium sulphate, ammonium sulphate, zinc sulphate and salts of aryl sulphonic acids. Cuprammonium solutions of cellulose may be extruded into aqueous coagulating baths containing, for example, acids or alkalies. In the case of viscose coagulating baths the baths may also very advantageously contain substantial quantities of glucose or similar substances. Preferably the coagulating baths contain, in addition to the above constituents, substantial proportions of wetting or dispersing agents, e. g. sulphonated higher fatty alcohols.

It is frequently of advantage to employ two or more coagulating baths of successively increasing coagulative power and to introduce the dyestuff or dyestuff intermediate into the bath or baths of lesser coagulative power. This is of particular importance where the constitution of the final coagulating bath which it is desired to employ is such that it would be difficult to effect dissolution of a sufficiency of the desired dyestuff or dyestuff intermediate in it. Thus, for example, cuprammonium solutions of cellulose may be spun first into a bath of water, e. g. warm water, and then into an alkaline bath, and the desired dyestuff or dyestuff intermediate may be incorporated in the first water bath. Again, viscose solutions may be spun first into an aqueous bath containing a relatively small proportion of a salt, e. g. sodium sulphate or ammonium sulphate, and then into a bath containing sulphuric acid or an aryl sulphonic acid, and the dyestuff or dyestuff component may be incorporated in the first of these baths.

The extruded materials may be washed with water or acid or alkaline solutions, as desired, and may be collected in a centrifugal spinning box or on bobbins. It is frequently convenient to effect the washing of the materials while they are in the form of a cake, produced by collecting the materials in a centrifugal spinning box.

The spent coagulating liquor may be treated for the recovery of residual dyestuff. Thus, for example, dyestuffs may be precipitated from the spent coagulating liquor by the addition of suitable salts.

The materials may be stretched continuously with their production, e. g. with the aid of moving coagulating baths, and may be subjected to any of the usual after-treatments, e. g. stretching processes, processes to modify their lustre, and scouring processes.

The following example illustrates the invention but is not to be regarded as limiting it in any way:

*Example*

A cuprammonium solution of cellulose is extruded through small circular orifices into a bath of water maintained at 80–95° C. which contains about 0.5 to 1% of sodium sulphate and about 0.2% of the brown dyestuff obtained by coupling tetrazotised 4:4'-diamino-diphenyl-ether with one molecule of 1-amino-5-naphthol-7-sulphonic acid (alkaline coupling) and with one molecule of 1-naphthol-4-sulphonic acid. The filaments issuing from the bath are then led into a 30% aqueous solution of caustic soda which contains about 6% of sugar, the bath being maintained at about 50° C. The filaments issuing from this bath are then washed, dried and collected.

Having described our invention what we desire to secure by Letters Patent is:

1. Process for the production of colored regenerated cellulose artificial filaments, threads, ribbons, films, foils and other materials, which comprises extruding a solution of cellulosic material through a suitable shaping device, coagulating the extruded materials by passing them through an aqueous coagulating bath containing dissolved therein a water-soluble dyestuff having affinity for the cellulosic materials, and then through a coagulating bath of greater coagulative power than said coagulating bath containing a water-soluble dyestuff.

2. Process for the production of colored regenerated cellulose artificial filaments, threads, ribbons, films, foils and other materials, which comprises extruding a solution of cellulosic material through a suitable shaping device, passing the extruded materials through an aqueous coagulating bath containing dissolved therein a dyestuff intermediate, winding up the materials and converting the said intermediate to a dyestuff on the materials before completion of the winding-up operation.

3. Process for the production of colored regenerated cellulose artificial filaments, threads, ribbons, films, foils and other materials, which comprises extruding a solution of cellulosic material through a suitable shaping device, passing the extruded materials through an aqueous coagulating bath containing dissolved therein the components of an azo dyestuff, winding up the materials and forming the azo dyestuff on the materials before completion of the winding-up operation.

4. Process for the production of colored regenerated cellulose artificial filaments, threads, ribbons, films, foils and other materials, which comprises extruding a solution of cellulosic material through a suitable shaping device, passing the extruded materials through an aqueous coagulating bath containing dissolved therein the leuco derivative of a vat dyestuff, winding up the materials and developing the said vat dyestuff on the materials before completion of the winding-up operation.

5. Process for the production of colored regenerated cellulose artificial filaments, threads, ribbons, films, foils and other materials, which comprises extruding a solution of cellulosic material through a suitable shaping device, coagulating the extruded materials by passing them through an aqueous coagulating bath containing dissolved therein the components of an azo dyestuff, and then through a coagulating liquid of greater coagulative power than said coagulating bath containing the components of an azo dyestuff, and forming the azo dyestuff on the materials.

6. Process for the production of colored regenerated cellulose artificial filaments, threads, ribbons, films, foils and other materials, which comprises extruding a solution of cellulosic material through a suitable shaping device, coagulating the extruded materials by passing them through an aqueous coagulating bath containing dissolved therein a leuco derivative of a vat dyestuff, and then through a coagulating liquid of greater coagulative power than said coagulating bath containing a leuco derivative of a vat dyestuff, and developing the said vat dyestuff on the materials.

7. Process for the production of colored regenerated cellulose artificial filaments, threads, ribbons, films, foils and other materials, which comprises extruding a solution of cellulosic material through a suitable shaping device, coagulating the extruded materials by passing them through an aqueous coagulating bath containing dissolved therein the components of an azo dyestuff, and then through a coagulating liquid of greater coagulative power than said coagulating bath containing the components of an azo dyestuff, winding up the materials, and forming the azo dyestuff on the materials before completion of the winding-up operation.

8. Process for the production of colored regenerated cellulose artificial filaments, threads, ribbons, films, foils and other materials, which comprises extruding a solution of cellulosic material through a suitable shaping device, coagulating the extruded materials by passing them through an aqueous coagulating bath containing dissolved therein the leuco derivative of a vat dyestuff, and then through a coagulating liquid of greater coagulative power than said coagulating bath containing a leuco derivative of a vat dyestuff, winding up the materials, and developing the said vat dyestuff on the materials before completion of the winding-up operation.

9. Process for the production of colored regenerated cellulose artificial filaments, threads, ribbons, films, foils and other materials, which comprises extruding a solution of cellulosic material through a suitable shaping device, coagulating the extruded materials by passing them through an aqueous coagulating bath containing dissolved therein a water-soluble coloring matter compound having affinity for the cellulosic materials and then through a coagulating bath of greater coagulative power than said coagulating bath containing a water-soluble coloring matter compound.

PERCY FREDERICK COMBE SOWTER.
REUBEN BETTERIDGE.